United States Patent [19]

Armor

[11] 4,225,511
[45] Sep. 30, 1980

[54] DIRECT OXIMATION OF KETONES USING GALLIA CATALYSTS

[75] Inventor: John N. Armor, Morris Plains, N.J.

[73] Assignee: Allied Chemical Corporation, Morris Township, Morris County, N.J.

[21] Appl. No.: 30,192

[22] Filed: Apr. 16, 1979

Related U.S. Application Data

[63] Continuation-in-part of Ser. No. 895,325, Apr. 11, 1978, Pat. No. 4,163,756.

[51] Int. Cl.$^2$ .................. C07C 131/00; C07C 131/04
[52] U.S. Cl. .......................... 260/566 A; 260/566 R; 252/438
[58] Field of Search ............. 260/566 R, 566 A; 252/438, 463; 423/404

[56] References Cited

U.S. PATENT DOCUMENTS

| | | | |
|---|---|---|---|
| 1,322,291 | 11/1919 | Classen | 423/404 |
| 3,094,384 | 6/1963 | Bertolacini et al. | 252/463 |
| 3,574,750 | 4/1971 | Yasui et al. | 260/566 A |

FOREIGN PATENT DOCUMENTS 1173773  12/1969  United Kingdom ................ 260/566 R

OTHER PUBLICATIONS

"Handbook of Chemistry and Physics", The Chemical Rubber Co., 50th Ed., (1969-1979), p. C-258.
Kirk-Othmer "Encyclopedia of Chemical Technology", 2nd Ed. (1966), vol. 10, p. 318.

*Primary Examiner*—Natalie Trousof
*Assistant Examiner*—L. Hendriksen
*Attorney, Agent, or Firm*—Robert A. Harman

[57] ABSTRACT

Ammonia, oxygen e.g., as air, and a ketone react in contact with a gallium oxide catalyst at temperatures such as 50°–500° C., especially such catalyst obtained by heating hydrated gallium nitrate in air at about 350° C. for several hours. The oximes have known utilities, including uses as oxidation inhibitors and as intermediates for production of amides. In particular, when the ketone is cyclohexanone, the cyclohexanone oxime in the reaction product can further be converted to the cyclic amide, caprolactam, e.g. by contacting the product with an aluminosilicate catalyst (treated with boric acid) having average pore diameter of at least 7 angstroms, especially a molecular sieve, suitably downstream in the same direction vessel. Caprolactam is the monomer starting material for nylon 6.

6 Claims, No Drawings

DIRECT OXIMATION OF KETONES USING GALLIA CATALYSTS

DESCRIPTION

CROSS-REFERENCE TO RELATED APPLICATION

This application is a continuation-in-part of my copending application Ser. No. 895,325 filed Apr. 11, 1978 and now issued as U.S. Pat. No. 4,163,756 of Aug. 7, 1979.

BACKGROUND OF THE INVENTION

This application relates to oxidation of ammonia whereby direct oximation of ketones is achieved.

It is known that ammonia can be oxidized at high temperatures such as 780° C. by air producing mainly nitrogen and water together with small traces of ammonium nitrate and nitrogen dioxide. By use of a catalyst such as platinum gauze, or Pt/Rh, it is known to oxidize ammonia with air to nitric oxide. The nitric oxide reacts further with oxygen of air to form nitrogen dioxide which is absorbed in water to form nitric acid. The normal commercial process for production of the partial oxidation product, hydroxylamine, is by oxidation of ammonia to nitrogen oxides over cobalt oxide catalyst, followed by reduction of nitrogen oxides using sulfur dioxide in the so-called Raschig process, or by reduction of nitric oxide by hydrogen over a platinum-on-carbon catalyst. It has also been reported that ammonia is oxidized by oxygen to hydroxylamine plus nitrous acid as the main products condensed on the vessel walls (by liquid air cooling), when passed over a platinum catalyst at low pressure and at very high temperatures (740°–1350° C.)—W. Kraus, Z. Phys. Chem. Part B, vol. 39 of 1938, pg. 83; vol. 45 of 1939, pg. 1; Z Elektrochem. vol. 54 of 1950, pg. 264; also that ammonia adsorbed on activated carbon in presence of air and water vapor forms hydroxylamine (C. Courtny et al., Comptes Rendus vol. 223 of 1946, page 624). See Chemical Abstracts vol. 34 of 1940 col. 931(8); vol. 32 of 1938, col. 4865(4); vol. 45 of 1951 col. 29(g); vol. 41 of 1947 col. 1945(b).

SUMMARY OF THE INVENTION

In the present process, ammonia and oxygen (optionally in the form of air) are mixed with a ketone and contacted with a solid gallium oxide catalyst, especially such catalyst obtained by heating hydrated gallium nitrate, $Ga(NO_3)_3 \cdot xH_2O$, in air at about 350° C. for several hours. The catalyst should have surface area of at least 1 square meter per gram; and in general will desirably have surface area in the broad range of 100–500 $m^2/g$.

At suitable temperatures in the broad range of 50°–500° C., the oxime of said ketone is thereby formed in a form which can be recovered as a reaction product.

DETAILED DESCRIPTION AND PREFERRED EMBODIMENTS

In a preferred embodiment of the invention, the ketone employed is cyclohexanone, the resulting oxime being cyclohexanone oxime. It is known (U.S. Pat. No. 3,503,958 of Mar. 31, 1970 to P. S. Landis) that oximes containing 3–20 carbon atoms can be rearranged in liquid or vapor phase, using certain conditions, over aluminosilicate catalyst such as the zeolites and the molecular sieve materials to produce valuable industrial products such as caprolactam from cyclohexanone oxime. The catalyst should have average pore diameter of at least 7 angstroms. Accordingly, the reaction product of the present process can be passed into contact with an aluminosilicate catalyst having average pore diameter of at least 7 angstroms, more particularly at least 10 angstroms, at temperatures such as about 170°–370° C. (As indicated below, such catalyst can be treated with boric acid). Thereby at least a partial conversion of the oxime in the product to an amide is obtained. If desired, this conversion can be downstream in the same reaction vessel as used for the ammonia/ketone/oxygen reaction, using a sufficiently large bed of rearrangement catalyst to obtain optimum conversion of the oxime to amide. The amide can be recovered and the unreacted ketone and oxime can be recycled.

More recently, catalysts comprising boron oxide on a support have been employed for the vapor phase rearrangement of cyclohexanone oxime to caprolactam, e.g. on a small particle size carbon support as in British Pat. No. 1,499,525 of Feb. 1, 1978 to Immel et al. (assigned to Bayer A. G.).

In the present process, the reactants can be introduced into the reaction zone and the oxime product can be removed therefrom in the gaseous state, or the ketone can be in the liquid state, e.g., in solution, with ammonia and oxygen also in solution and/or dispersed in the liquid. The reaction can be conducted in the liquid phase, or in a trickle mode; preferably it is conducted entirely in the vapor phase.

For operation in the vapor phase, suitably but not necessarily, the present process is operated using excess ammonia, and about equivalent ketone:oxygen proportions. For safety reasons it is desirable to maintain the proportions of reactants outside the explosive limits (which for ammonia in air are about 15%–28% by volume); and for ketone in air are about 1%–8% by volume. A series of inlets for one or more of the reactants can be used to control the proportions of reactants present.

Diluent gas can be used to keep the composition out of the explosive range and/or to assist removal of oxime adsorbed on the catalyst. A liquid solvent can be used for removal of oxime from the catalyst, either intermittently or continuously trickling over the catalyst or flushing out organic material from the catalyst.

The reaction time allowed in passing the reaction mixture vapors through the bed of solid catalyst of oxime production is generally from about 0.1 to 10 seconds of contact time. The total pressure will generally be in the range from about 1 to 50 atmospheres, especially 1 to 10 atmospheres. The preferred temperature range for reaction of cycloalkyl, dialkyl and alkyl aryl ketones is about 60° C.–400° C.; and more specifically for cyclohexanone the preferred range is 120° C.–250° C.

Ketones which can be used must, of course, be reasonably stable at the reaction conditions of temperature, time and catalyst. In general any cycloalkyl, dialkyl, or alkyl aryl ketone having 3–20 carbon atoms can be used, such as acetone, methylethyl ketone, methyl isopropyl ketone, ethyl butyl ketone, the pentanones, cyclohexanone, methylcyclohexanone, norcamphor, cyclopentanone, cyclohexyl methyl ketone, acetophenone, and methyl benzyl ketone. Alcohols oxidizable to ketones, e.g. cyclohexanol, can also be used as starting materials in my process.

The Example which follows is illustrative of this invention and of the best mode contemplated by me for carrying out the invention, but is not to be interpreted in a limiting sense.

In the Example, the reaction was carried out at about atmospheric pressure in a borosilicate glass tube of about 12 mm outside diameter, containing a coarse glass frit to hold the catalyst in place. The glass tube reactor, equipped for downward cocurrent feed of ammonia and oxygen gases and cyclohexanone vapor, was contained inside a tube furnace, electrically heated. As the catalyst bed is made deeper, under otherwise the same conditions, the extent of conversion increases. The depth of catalyst bed in the Example was about 0.5 cm. The temperature, measured at the wall of the furnace, was maintained practically constant at 200° C. The reactor was operated automatically using a cam timer to actuate the sampling valves for reactants and products.

The products emerging from the bottom of the reactor passed through heated lines for continuous analysis by gas chromatography.

EXAMPLE (A) Preparation of gallium oxide catalyst 5.12 gm of commercial gallium nitrate hydrate was heated to 350° in air overnight in a muffle furnace. The yield of the white oxide was 2.7 g. Analysis for N indicated <1% N was present. The surface area of the oxide was measured as 133 m²/g.

(B) Oxime Production

A gas stream of helium (8.5 cc/min.), ammonia gas (10.5 cc/min.) and oxygen gas (2.5 cc/min.) was fed downward into the reactor along with vaporized cyclohexanone at about 0.5 cc/min (as the vapor). The proportions by volume of the reactants in gas phase were: ammonia-50%; ketone-2.4%; oxygen-12%; balance was helium.

Selectivity (to oxime) of 50%, at 38% conversion of the ketone was obtained (i.e. a yield of oxime of 19% of theory based on the cyclohexanone employed).

In general, gallium oxide having surface area of at least 1 m²/g shows at least minimal activity as a catalyst to produce oxime from ammonia, oxygen and a ketone. For example commercial (powder) gallium oxide, $Ga_2O_3$, produces small amounts of oxime.

A more active form of gallium oxide can be obtained as in the above Example, by heating of hydrated gallium nitrate. Such form has surface area of at least 100 m²/g; no upper limit has been established nor is to be expected (except for practical reasons such as desired resistance of the catalyst to abrasion). I have found, however, that the activity and selectivity of catalysts, prepared in accordance with the above Example, for oxime production vary considerably from one such preparation to another for reasons not presently understood.

I claim:

1. Direct process for production of oxime which comprises passing a mixture consisting essentially of ammonia, oxygen and a ketone in contact with a solid catalyst consisting essentially of gallium oxide having a surface area of at least 1 square meter per gram, at temperature in the range of 50° C.–500° C., thereby producing oxime in recoverable form as a reaction product.

2. Process of claim 1 wherein the temperature is in the range from about 60° C. up to about 400° C. and wherein the catalyst is obtained by heating hydrated gallium nitrate in air at about 350° C. for several hours.

3. Process of claim 2 wherein the reaction is conducted in the vapor phase employing diluent gas.

4. Process of claim 3 wherein the catalyst has surface area of at least 100 m²/g.

5. Process of claim 4 wherein the ketone is cyclohexanone and the reaction temperature is in the range 120° C.–250° C.

6. Process of claim 1 wherein the ketone is a cycloalkyl, dialkyl, or alkyl aryl ketone having 3–20 carbon atoms.

* * * * *